March 15, 1927.
J. PHILLIPS
1,621,430
HUMIDIFYING DEVICE
Filed Sept. 11, 1925
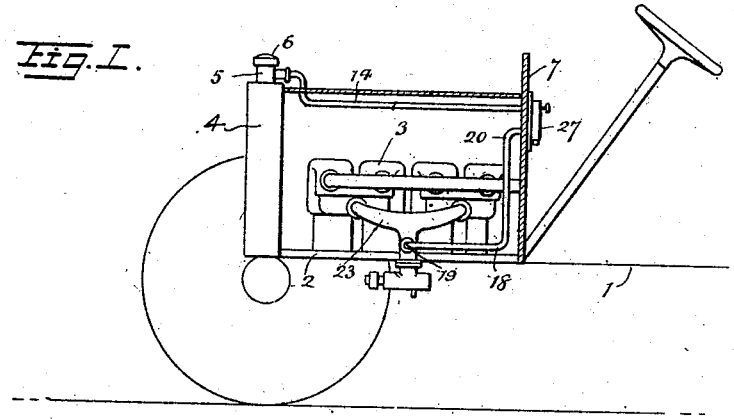
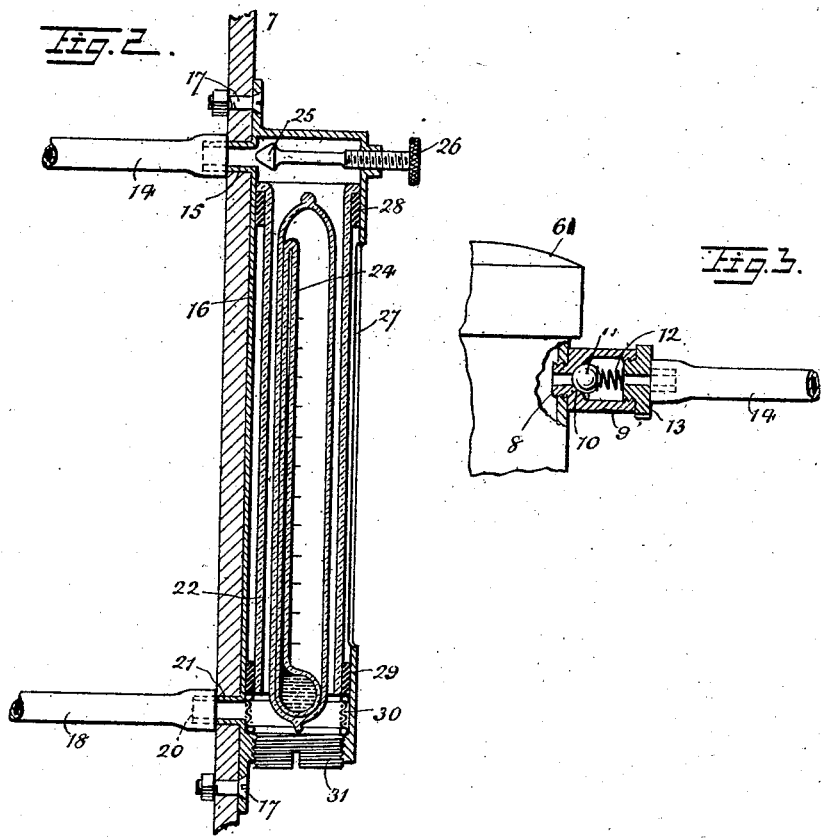
WITNESSES
H. T. Walker
A. L. Kitchin
INVENTOR
Jack Phillips
BY
ATTORNEYS Patented Mar. 15, 1927.

1,621,430

UNITED STATES PATENT OFFICE.

JACK PHILLIPS, OF NEW YORK, N. Y.

HUMIDIFYING DEVICE.

Application filed September 11, 1925. Serial No. 55,870.

This invention relates to attachments for automobile engines and particularly to an improved carbon remover, gasoline saver and thermometer and has for an object to provide an improved construction wherein the cylinders of the engine may be maintained clean by a continuous but slight injection of steam vapor into the cylinders during the operation thereof.

Another object of the invention is to provide an improved construction wherein the vapor from an automobile engine radiator is directed to the various cylinders of the automobile during the operation of the engine.

A further object of the invention is to provide means for directing the vapor from the radiator of the automobile engine into the cylinders and an improved connecting structure provided with a thermometer whereby the vapor passing from the radiator to the engine will act on the thermometer to show the heat of the steam used.

In the accompanying drawing—

Figure 1 is a conventional showing of the front part of an automobile, the same being illustrated in section and showing one embodiment of the invention.

Figure 2 is an enlarged sectional view through the thermometer and associated parts shown in Figure 1.

Figure 3 is an enlarged fragmentary view partly in section, showing the connection of the radiator with the pipe extending to the engine.

Referring to the accompanying drawing by numerals, 1 indicates an automobile of any desired kind, said automobile being provided with an engine 2 having a number of cylinders 3. A radiator 4 is provided with the usual filling stem 5 and cap 6. Also, the automobile 1 is provided with the usual dashboard or instrument board 7.

As indicated in Figures 1 and 2, the filling stem 5 is provided with a threaded aperture into which the threaded end 8 of the valve casing 9 is screwed, said valve casing being provided with a valve seat 10 co-acting with the valve member or ball 11 normally held against seat 10 by the spring 12. A cap 13 is threaded into the casing 9, said cap acting to compress spring 12 and also acting to present means for receiving one end of the rubber hose 14. This hose at the opposite end is connected to a short pipe 15 secured in any desired manner to the casing 16 mounted on the dash 7 by bolts or other securing means 17. A tubular member 18 is connected at 19 to the intake manifold of the engine 2 and at 20 is connected to the pipe 21. The pipe 21 is in free communication with the interior of the casing 16 but also in free communication with the interior of the glass member 22 which in turn is in free communication with the pipe 14. By reason of these facts, whenever the engine 2 is operating, vapor from the upper part of the radiator 4 will be drawn through the glass member 22, tubes 14 and 18 and associated parts whereby said vapor will be discharged into the intake manifold 23 above the carbureter.

In case the water in the radiator boils and produces a large amount of steam, said steam will naturally heat the thermometer 24 as the same passes through the glass member 22. When the thermometer shows a predetermined heat, the operator will then know that too much vapor is being supplied to the engine and, consequently, will close the valve member 25 by rotating the thumb screw 26. If desired, this valve member may be only partly closed or entirely closed. The valve member 11 shown in Figure 3 is normally held on its seat against spring 12 until the engine has attained a certain speed whereupon it will move off of its seat and allow the vapor to flow into the respective cylinders of the engine. By reason of the spring 12 the vapor cannot flow into the engine while the same is idling or running very slow.

In constructing the casing 16, the same may be of any material, preferably metal. In order that the thermometer may be properly viewed at any time, an opening or door-way 27 is provided. The casing is, however, made tight by the glass member 22 which acts as a lining therefor and which is tightly connected therewith through the rubber or other washers 28 and 29. A ring screen member 30 is provided at the lower end of the casing 16 so as to prevent any foreign matter from entering tube 18. It will also be noted from Figure 2 that a threaded plug 31 is provided in the lower end of casing 16 whereby access may be had to the interior of the casing at any time for cleaning or for other purposes. By providing the construction just described, a proper amount of vapor may be admitted to the engine to maintain the same free of carbon and, consequently, more power will be secured from the fuel and thereby a certain amount of gasoline will be saved as the maximum efficiency of the gasoline is secured.

What I claim is:

In a device for supplying water vapor to internal combustion engines, a casing formed with a window, a removable plug at one end of the casing, an inlet pipe at the opposite end of the casing, a valve carried by the casing adapted to close said inlet pipe, an outlet pipe at one end of the casing near the removable plug, a glass container positioned in said casing and extending from near one end to near the opposite end, said container being open at both ends, a supporting gasket surrounding said container at each end and impinging said casing whereby the water vapor entering through said inlet pipe may pass through the container before it can pass out said outlet pipe, and a strainer in said casing adjacent said outlet pipe.

JACK PHILLIPS.